US012707432B2

(12) United States Patent
Lin

(10) Patent No.: US 12,707,432 B2
(45) Date of Patent: Aug. 11, 2026

(54) LOWER LAYER FAILURE HANDLING WHEN ASSIGNING PEIPS PAGING SUBGROUP ID

(71) Applicant: MEDIATEK INC., Hsin-Chu (TW)

(72) Inventor: Yuan-Chieh Lin, Hsin-Chu (TW)

(73) Assignee: MEDIATEK INC., Hsinchu City (TW)

( * ) Notice: Subject to any disclaimer, the term of this patent is extended or adjusted under 35 U.S.C. 154(b) by 796 days.

(21) Appl. No.: 18/088,322

(22) Filed: Dec. 23, 2022

(65) Prior Publication Data

US 2023/0262653 A1 Aug. 17, 2023

Related U.S. Application Data

(60) Provisional application No. 63/301,510, filed on Jan. 21, 2022.

(51) Int. Cl.
*H04W 68/02* (2009.01)
*H04W 60/00* (2009.01)

(52) U.S. Cl.
CPC ........... *H04W 68/02* (2013.01); *H04W 60/00* (2013.01)

(58) Field of Classification Search
CPC ..... H04W 68/02; H04W 60/00; H04W 60/04; H04W 52/0258; H04W 68/005; H04W 52/0216; H04W 68/025
See application file for complete search history.

(56) References Cited

U.S. PATENT DOCUMENTS

2021/0105837 A1 4/2021 Lee
2023/0125555 A1* 4/2023 Gupta ..................... H04W 8/22 370/329
2023/0362640 A1* 11/2023 Edge ..................... H04W 12/06
2023/0362704 A1* 11/2023 Edge ..................... H04W 24/10
(Continued)

FOREIGN PATENT DOCUMENTS

CN 112136349 A 12/2020
CN 116114327 A8 * 5/2024 ............ H04W 68/00
(Continued)

OTHER PUBLICATIONS

Taiwan Intellectual Property Office Action 112102267 , dated Oct. 17, 2023 (3 pages).
(Continued)

*Primary Examiner* — Charles T Shedrick
(74) *Attorney, Agent, or Firm* — Helen Mao; Zheng Jin; Imperium Patent Works

(57) ABSTRACT

A method of handling lower layer failure when assigning a Paging Early Indication with Paging Subgrouping (PEIPS) subgroup ID is proposed. If a network supports and accepts the use of PEIPS assistance information for a UE, the network can provide to the UE the negotiated PEIPS assistance information containing a new Paging subgroup ID and a new 5G-GUTI in a REGISTRATION ACCEPT message or in a CONFIGURATION UPDATE COMMAND message, and the UE was assigned with an old paging subgroup ID. When lower layer failure occurs, the network may not successfully receive a REGISTRATION COMPLETE message or a CONFIGURATION UPDATE COMPLETE message from the UE. Accordingly, the network needs to use both possible paging subgroup IDs for the UE until one of the paging subgroup IDs is considered invalid.

20 Claims, 4 Drawing Sheets

(56) References Cited

U.S. PATENT DOCUMENTS

2024/0365282 A1* 10/2024 Wu .................... H04W 68/005
2025/0024352 A1* 1/2025 Shi ....................... H04W 48/10
2025/0089017 A1* 3/2025 Wang ................ H04W 74/0808

FOREIGN PATENT DOCUMENTS

WO WO-2010048781 A1 * 5/2010 ............ H04W 24/00
WO 2022007876 A1 1/2022
WO WO-2023003438 A1 * 1/2023 ........ H04W 74/0808

OTHER PUBLICATIONS

Paging Subgrouping updates in Registration and UE Configuration Update procedure , 3GPP Jan. 20, 2022 , 3GPP C1-220684, 3GPP TSG CT WG1 Meeting #133-bis-e, Jan. 17-21, 2022.
MediaTek Inc. : "New Requirements of PEIPS", 3GPP Jan. 10, 2022 , 3GPP C1-220162, 3GPP TSG CT WG1 Meeting #133-bis-e, Jan. 17-21, 2022.
Europe IPO, search report for the European patent application 23151059.5, dated May 9, 2023 (16 pages).
3GPP project, NAS protocol for 5GS, 3GPP TS 24.501, vol. CT WG1, No. V17.5.0 Jan. 5, 2022, pp. 1-916, XP052118353, retrieved from the internet: URL:https://ftp.3gpp.org/Specs/archive/24_series/24.501/24501-h50.zip_24501-h50.docx.
SAMSUNG: "Collision between UCU and SR", 3GPP draft, C1-220802, vol. CT WG1, No. E-meeting, Jan. 17, 2022-Jan. 21, 2022 Jan. 20, 2022, XP052101700, Retrieved from Internet: URL:https://ftp.3opp.org/tsq_ct/WG1_mm-cc-sm_ex-CN1/TSGC1_133e-bis/Docs/01-220802.zip_C1-220802-01-220413_MUSIM_24501_Col_v1.docx.
APPLE: "Paging Subgrouping updates in Registration and UE Configuration Update procedure", 3GPP, C1-220684, vol. CT WG1, No. E-meeting, Jan. 17, 2022-Jan. 21, 2022 Jan. 20, 2022, XP052101582, Retrieved from Internet: URL:https://ftp.3gpp.org/tsg_ct/WG1_mm-cc-sm_ex-CN1/TSGC1_133e-bis/Docs/C1-220684.zip_C1-220684_was_220273_24501_PagingSubgrouping_v3.doxc.
Mediatek Inc: "New Requirements of PEIPS", 3GPP draft, C1-220162, vol. CT WG1, No. E-meeting, Jan. 17, 2022-Jan. 21, 2022 Jan. 10, 2022, XP052090428, retrieved from internet: URL:https://ftp.3gpp.org/isg_ct/WG1_mm-cc-sm_ex-CN1/TSGC1_133e-bis/Docs/C1-220162.zip_C1-220162_New Requirements_of_PEIPS_24501_CR3858.docx.
Vivek Gupta et al. "Abnormal cases in Registration procedure for handling WUS assistance information", 3GPP draft, C1-225178, Type CR, CR 4523, vol. 3GPP CT1, No. Online, Aug. 18, 2022-Aug. 26, 2022 Aug. 23, 2022, XP052205900, retrieved from internet: URL:https://ftp.3gpp.org/tsg_ct/WG1_mm-cc-sm_ex-CN1/TSGC1_137e/Docs/C1-225178.zip_C1-225178_was_224778_WUS_Abnormal_Reg_24501_h71_v2.docx.
3GPP project, NAS protocol for 5GS, 3GPP TS 24.501, vol. CT WG1, No. V18.0.1 Sep. 26, 2022, pp. 1-1007, XP052211191, retrieved from the internet: URL:https://ftp.3gpp.org/Specs/archive/24_series/24.501/24501-i01.zip 24501-i01.docx.
China Intellectual Property Office Action 202310073663.5 Dated Jun. 19, 2025 (No English Translation available).
<TS 24.501 V17.5.0>, 3GPP ,Non-Access-Stratu m (NAS) protocol for 5G System (5GS); Stage 3; (Release 17) (pp. 1-887) Jan. 5, 2022 https://www.3gpp.org/ftp/Specs/archive/24_series/24.501/.
3Gpp, tsg_ct\wg1_mm-cc-sm_ex-cn1, "c1-22xxxx_was0162_new requirements of peips_24501_cr3858_draft_rev01".
<3GPP TSG-CT WG1 Meeting #133-bis-eC1-220684>, Apple, Paging Subgrouping updates in Registration and UE Configuration Update procedure.

* cited by examiner

LOWER LAYER FAILURE HANDLING WHEN ASSIGNING PEIPS PAGING SUBGROUP ID

CROSS REFERENCE TO RELATED APPLICATION

This application claims priority under 35 U.S.C. § 119 from U.S. Provisional Application No. 63/301,510 entitled "Lower Layer Failure Abnormal when assign PEIPS paging subgroup ID," filed on Jan. 21, 2022, the subject matter of which is incorporated herein by reference.

TECHNICAL FIELD

The disclosed embodiments relate generally to wireless communication systems, and, more particularly, to handling lower layer failure by the network when assigning a Paging Early Indication with Paging Subgrouping (PEIPS) subgroup ID to UE.

BACKGROUND

Third generation partnership project (3GPP) and 5G New Radio (NR) mobile telecommunication systems provide high data rate, lower latency and improved system performances. In 3GPP NR, 5G terrestrial New Radio (NR) access network (includes a plurality of base stations, e.g., Next Generation Node-Bs (gNBs), communicating with a plurality of mobile stations referred as user equipment (UEs). Orthogonal Frequency Division Multiple Access (OFDMA) has been selected for NR downlink (DL) radio access scheme due to its robustness to multipath fading, higher spectral efficiency, and bandwidth scalability. Multiple access in the downlink is achieved by assigning different sub-bands (i.e., groups of subcarriers, denoted as resource blocks (RBs)) of the system bandwidth to individual users based on their existing channel condition. In LTE and NR networks, Physical Downlink Control Channel (PDCCH) is used for downlink scheduling. Physical Downlink Shared Channel (PDSCH) is used for downlink data. Similarly, Physical Uplink Control Channel (PUCCH) is used for carrying uplink control information. Physical Uplink Shared Channel (PUSCH) is used for uplink data. In addition, physical random-access channel (PRACH) is used for non-contention-based RACH.

One important use of broadcast information in any cellular systems is to set up channels for communication between the UE and the gNB. This is generally referred to as paging. Paging is a procedure the wireless network uses to find a UE, before the actual connection establishment. Paging is used to alert the UE of an incoming session (e.g., mobile terminated voice call, or downlink IP packets). In most cases, the paging process happens while UE is in radio resource control (RRC) idle mode or inactive mode. This means that UE has to monitor whether the networking is sending any paging message to it, and it has to spend some energy to run this "monitoring" process. During idle/inactive mode, a UE gets into and stays in sleeping mode defined in discontinuous reception (DRX) cycle. UE periodically wakes up and monitors PDCCH to check for the presence of a paging message. If the PDCCH indicates that a paging message is transmitted in a subframe, then the UE demodulates the paging channel to see if the paging message is directed to it.

In NR, paging reception consumes less than 2.5% of the total power. However, due to synchronization signal block (SSB) transmission scheme in NR, LOOP operations (including AGC, FTL, and TTL) and measurements (MEAS) can only be performed in certain occasions. As a result, the gap between the SSBs for LOOP/MEAS and paging occasion (PO) is longer, and UE may enter light sleep mode in the gap. If there is an indication before paging and UE monitors PO only if the indication exists, then UE can save power not only for paging reception, but also for the light sleep between the last SSB and PO gap.

In 5G system, paging early indication (PEI) notifies UEs of potentially relevant incoming paging such that these UEs are then able to skip POs in which the UEs are (definitely) not being paged, thus saving power (decoding POs being more power hungry than decoding PEI). To this effect, UE subgrouping is introduced that allows waking up subgroups of UEs for potentially relevant paging. The RAN and UE may use a Paging Early Indication with Paging Subgrouping (PEIPS) to reduce the UE's power consumption in RRC_IDLE and RRC_INACTIVE over NR. The Paging Subgrouping can be based on either the UE's temporary ID or a paging subgroup allocated by the AMF.

To support PEIPS, Paging Subgrouping Support Indication and PEIPS Assistance Information (Paging Subgroup ID) is used by the 5GC and NG-RAN to help determine whether PEIPS applies to the UE and which paging subgroup used when paging the UE. The PEIPS Assistance Information (contains Paging Subgroup ID) can configured and updated using a REGISTRATION procedure or a CONFIGURATION UPDATE procedure. During registration procedure, CONFIGURATION UPDATE COMMAND/COMPLETE can be part of it. If a lower layer failure occurs during a REGISTRATION or CONFIGURATION UPDATE procedure and the 5G-GUTI and Paging subgroup ID are assigned in the procedure, abnormal handling of the lower layer failure will be difficult. Further, even if new 5G-GUTI and Paging subgroup ID are assigned in the same message, and if a lower layer failure occurs before the REGISTRATION or CONFIGURATION UPDATE procedure is completed, the network does not know which paging subgroup ID the UE will use for monitoring PEI.

A solution is sought.

SUMMARY

A method of handling lower layer failure when assigning a Paging Early Indication with Paging Subgrouping (PEIPS) subgroup ID to UE is proposed. If a network supports and accepts the use of PEIPS assistance information for a UE, the network can provide to the UE the negotiated PEIPS assistance information containing a new Paging subgroup ID and a new 5G-GUTI in a REGISTRATION ACCEPT message or in a CONFIGURATION UPDATE COMMAND message, and the UE was originally assigned with an old paging subgroup ID. When lower layer failure occurs, the network may not successfully receive a REGISTRATION COMPLETE message or a CONFIGURATION UPDATE COMPLETE message from the UE. Accordingly, the network needs to use both possible paging subgroup IDs for the UE until one of the paging subgroup IDs is considered invalid.

In one embodiment, a network entity determines paging early indication with paging subgrouping (PEIPS) is supported for a user equipment (UE) in a wireless communication network, wherein the UE is assigned with an existing 5G-GUTI and an existing paging subgroup ID. The network entity transmits a registration accept message or a configuration update command message to the UE, wherein the registration accept message or the configuration update command message comprises a new 5G-GUTI and a new paging subgroup ID. When the network needs to page the UE, the network entity transmits/broadcast one or more paging early indications by considering the existing paging subgroup ID as valid and the new paging subgroup ID as valid when the network entity does not receive a COMPLETE message from the UE in response to the registration accept message or the configuration update command message.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
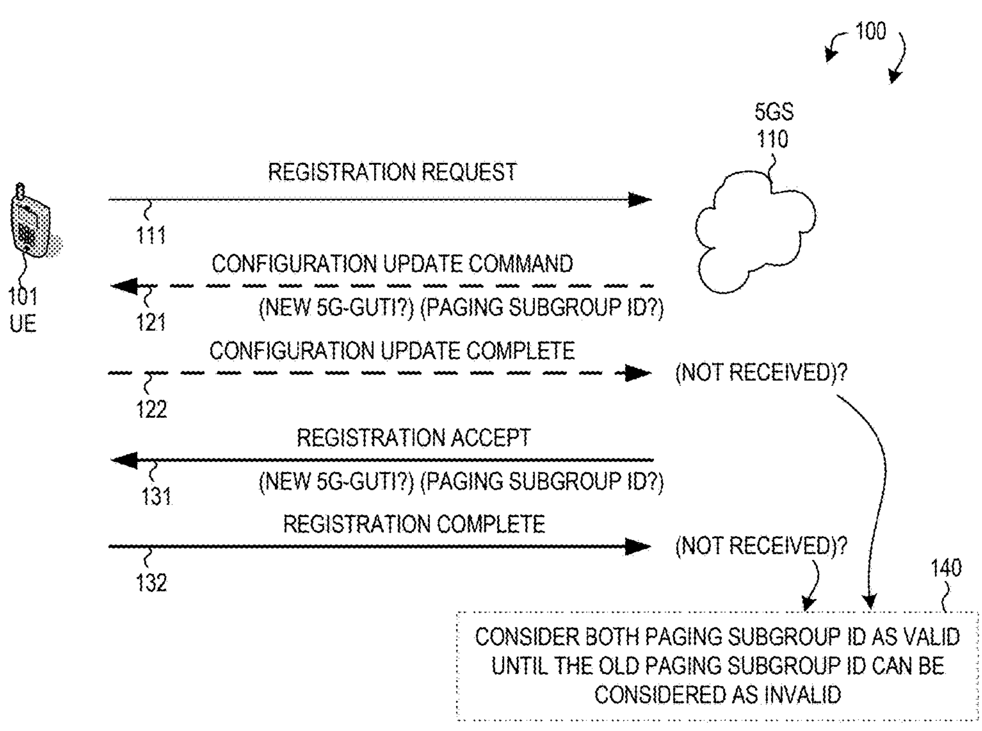
FIG. 1 illustrates a user equipment (UE) and a 5G network handling lower layer failure when assigning a Paging Early Indication with Paging Subgrouping (PEIPS) subgroup ID in accordance with one novel aspect.

FIG. 1 illustrates a user equipment (UE) 101 and a 5G network 100 handling lower layer failure when assigning a Paging Early Indication with Paging Subgrouping (PEIPS) subgroup ID in accordance with one novel aspect. In 3GPP network, a plurality of base stations, e.g., Next Generation Node-Bs (gNBs), communicating with a plurality of mobile stations referred as user equipment (UEs). Orthogonal Frequency Division Multiple Access (OFDMA) has been selected for downlink (DL) radio access scheme due to its robustness to multipath fading, higher spectral efficiency, and bandwidth scalability. Physical Downlink Control Channel (PDCCH) is used for downlink scheduling. Physical Downlink Shared Channel (PDSCH) is used for downlink data. Similarly, Physical Uplink Control Channel (PUCCH) is used for carrying uplink control information. Physical Uplink Shared Channel (PUSCH) is used for uplink data. In addition, physical random-access channel (PRACH) is used for non-contention-based RACH. On the other hand, a Non-Access Stratum (NAS) layer connection is used to convey non-radio signaling between UE and the Mobility Management Entity (MME) or the Access and Mobility Management Function (AMF) for access.

In 5G system, paging early indication (PEI) notifies UEs of potentially relevant incoming paging such that these UEs are then able to skip POs in which the UEs are (definitely) not being paged, thus saving power (decoding POs being more power hungry than decoding PEI). To this effect, UE subgrouping is introduced that allows waking up subgroups of UEs for potentially relevant paging. The RAN and UE may use a Paging Early Indication with Paging Subgrouping (PEIPS) to reduce the UE's power consumption in RRC_IDLE and RRC_INACTIVE over NR. The Paging Subgrouping can be based on either the UE's temporary ID or a paging subgroup allocated by the AMF. Each UE belongs to a paging subgroup based on the allocated paging subgroup ID, and the PEI is based on paging subgrouping.

To support PEIPS, Paging Subgrouping Support Indication and PEIPS Assistance Information (Paging Subgroup ID) is used by the 5GC and NG-RAN to help determine whether PEIPS applies to the UE and which paging subgroup used when paging the UE. The PEIPS Assistance Information (Paging Subgroup ID) can configured and updated using a REGISTRATION procedure or a CONFIGURATION UPDATE procedure. During registration procedure, CONFIGURATION UPDATE COMMAND/COMPLETE can be part of it. If a lower layer failure occurs during the REGISTRATION procedure or CONFIGURATION UPDATE procedure, abnormal handling of the lower layer failure will be difficult. Further, even if new 5G-GUTI and Paging subgroup ID are assigned in the same message, and if a lower layer failure occurs before the REGISTRATION or CONFIGURATION UPDATE procedure is completed, the network does not know which paging subgroup ID the UE will use for monitoring PEI, thus the network does not know what paging configuration (original or updated) the UE will apply.

In the example of FIG. 1, in step 111, UE 101 performs a REGISTRATION procedure with 5GS 110, by sending a REGISTRATION REQUEST message. During registration procedure, configuration update can be part of it. In one example, in step 121, the network sends a CONFIGURATION UPDATE COMMAND message, which may include a new 5G-GUTI and a new paging subgroup ID. In step 122, UE 101 sends a CONFIGURATION UPDATE COMPLETE message to the network if the UE receives the COMMAND message successfully. In another example, in step 131, the network sends a REGISTRATION ACCEPT message, which may include a new 5G-GUTI and a new paging subgroup ID. In step 132, UE 101 sends a REGISTRATION COMPLETE message to the network if the UE receives the ACCEPT message successfully.

However, if a lower layer failure occurs before the message CONFIGURATION UPDATE COMPLETE or REGISTRATION COMPLETE is successfully received by the network, then the network does not know whether UE 101 has received the CONFIGURATION UPDATE COMMAND message, or the REGISTRATION ACCEPT message. As a result, the network does not know whether UE 101 will monitor paging early indication (PEI) using an old paging subgroup ID or using the new paging subgroup ID. In accordance with one novel aspect, when there is need to send out PEI to UEs (i.e., page the UE) based on their paging subgroup ID, the network will consider both paging subgroup IDs as valid, until the old paging subgroup ID can be considered as invalid.

Figure 2:
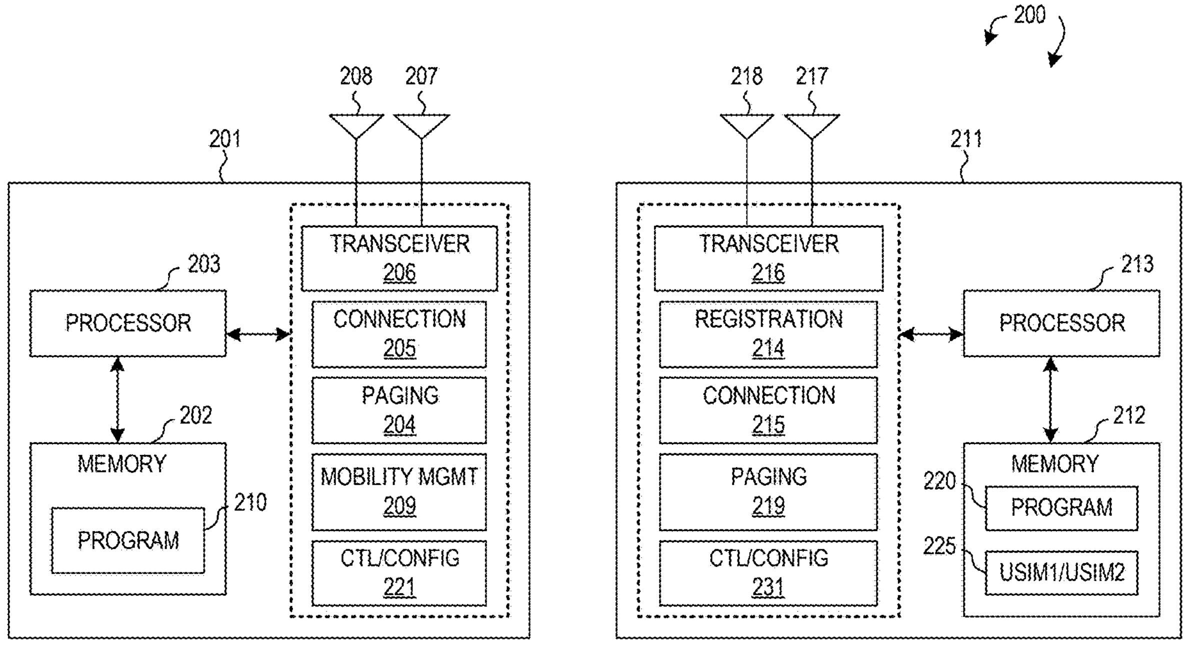
FIG. 2 is a simplified block diagram of a UE and a network entity in accordance with various embodiments of the present invention.

FIG. 2 is a simplified block diagram of wireless devices 201 and 211 in accordance with embodiments of the present invention. For wireless device 201 (e.g., a network entity AMF), antennae 207 and 208 transmit and receive radio signal. RF transceiver module 206, coupled with the antennae, receives RF signals from the antennae, converts them to baseband signals and sends them to processor 203. RF transceiver 206 also converts received baseband signals from the processor, converts them to RF signals, and sends out to antennae 207 and 208. Processor 203 processes the received baseband signals and invokes different functional modules and circuits to perform features in wireless device 201. Memory 202 stores program instructions and data 210 to control the operations of device 201.

Similarly, for wireless device 211 (e.g., a user equipment), antennae 217 and 218 transmit and receive RF signals. RF transceiver module 216, coupled with the antennae, receives RF signals from the antennae, converts them to baseband signals and sends them to processor 213. The RF transceiver 216 also converts received baseband signals from the processor, converts them to RF signals, and sends out to antennae 217 and 218. Processor 213 processes the received baseband signals and invokes different functional modules and circuits to perform features in UE 211. Memory 212 stores program instructions and data 220 and multiple USIM cards 225 to control the operations of UE 211.

The wireless devices 201 and 211 also include several functional modules and circuits that can be implemented and configured to perform embodiments of the present invention. In the example of FIG. 2, wireless device 201 is an AMF that includes a NAS singling connection handling module 205, a paging module 204, a mobility management module 209, and a control and configuration circuit 221. Wireless device 211 is a UE that includes a connection handling module 215, a registration module 214, a paging and mobility handling module 219, and a control and configuration circuit 231. Note that a wireless device may be both a transmitting device and a receiving device. The different functional modules and circuits can be implemented and configured by software, firmware, hardware, and any combination thereof. The function modules and circuits, when executed by the processors 203 and 213 (e.g., via executing program codes 210 and 220), allow AMF 201 and UE 211 to perform embodiments of the present invention.

In one example, the AMF 201 establishes NAS signaling connection with the UE 211 via connection handling circuit 205, pages UEs via paging module 204, performs mobility and handover management via mobility management module 209, and provides control and configuration information to UEs via configuration circuit 221. The UE 211 performs registration with the network via registration module 214, establishes signaling connection via connection handling circuit 215, monitors paging via paging module 219, and obtains configuration information via control and configuration circuit 231. Network entity 211 can be a single entity or multiple entities e.g., RAN+AMF.

Figure 3:
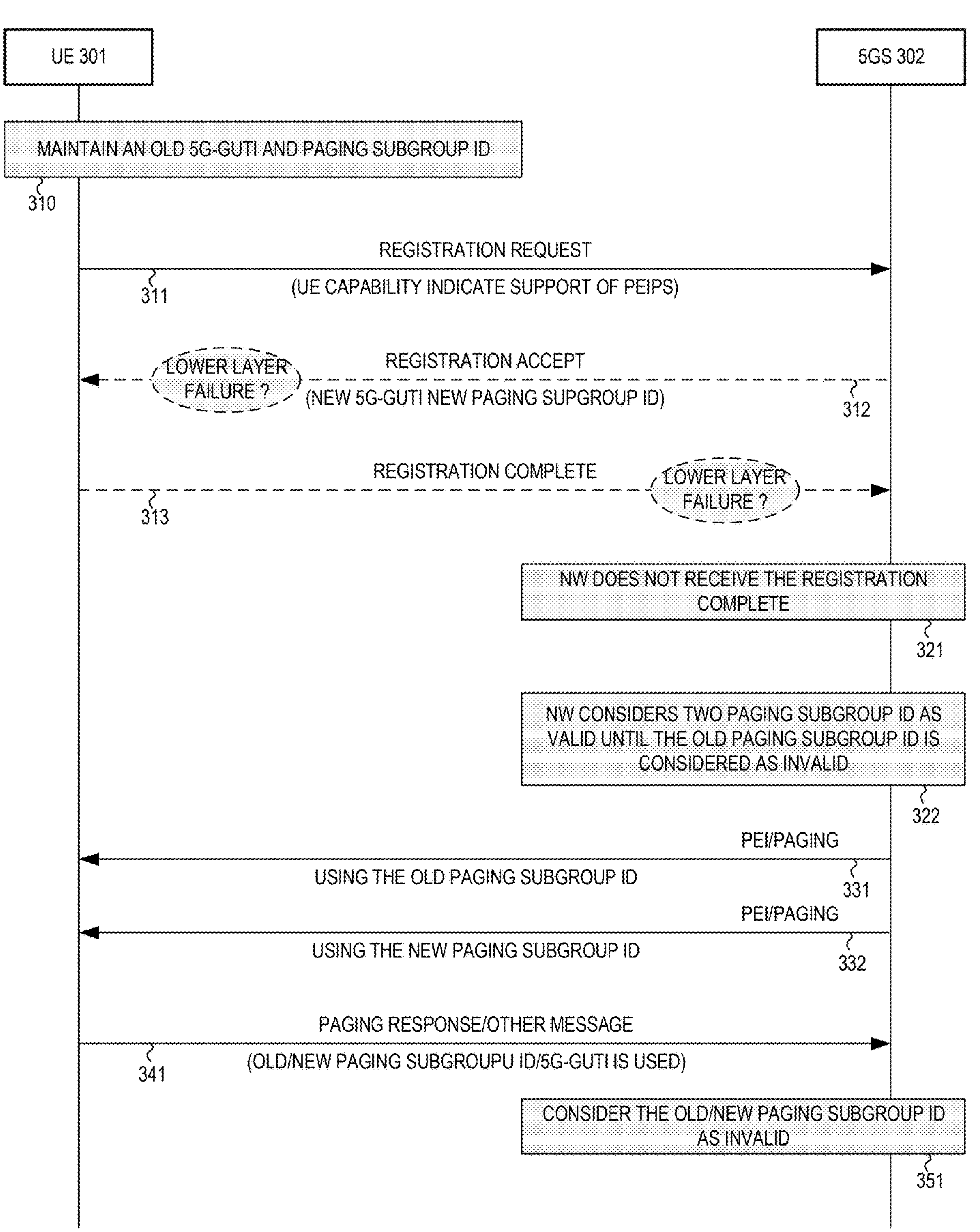
FIG. 3 illustrates one embodiment of handling lower layer failure when assigning a Paging Early Indication with Paging Subgrouping (PEIPS) subgroup ID during a registration procedure in accordance with one novel aspect.

FIG. 3 illustrates one embodiment of handling lower layer failure when assigning a Paging Early Indication with Paging Subgrouping (PEIPS) subgroup ID during a registration procedure in accordance with one novel aspect. The precondition (step 310) is that the network supports and accepts the use of PEIPS assistance information for the UE, and the UE indicates its capability to support NR paging subgrouping during a registration procedure. Further, UE 301 was previously assigned an old 5G-GUTI and an old paging subgroup ID.

In step 311, UE 301 sends a REGISTRATION REQUEST message to 5GS 502. For example, the REGISTRATION REQUEST message indicates UE capability of supporting PEIPS and may also include PEIPS assistance information. In step 312, 5GS 502 sends a REGISTRATION ACCEPT message back to UE 301. The REGISTRATION ACCEPT message includes (negotiated) PEIPS assistance information containing a new paging subgroup ID and a new 5G-GUTI. However, due to low layer failure, the REGISTRATION ACCEPT message may not be received by UE 301. If that is the case, then UE 301 continue to use the previous 5G-GUTI and the previous paging subgroup ID, without applying the new 5G-GUTI and the new paging subgroup ID. UE 301 will not (or is not able to due to e.g., lower layer failure) send a REGISTRATION COMPLETE message to the network.

On the other hand, if UE 301 successfully receives the REGISTRATION ACCEPT message, then UE 301 will apply the negotiated new paging subgroup ID in deriving the paging subgroup for monitoring PEI from the network. In addition, in step 313, UE 301 sends a REGISTRATION COMPLETE message to 5GS 302 to complete the registration procedure. However, e.g., due to low layer failure, the REGISTRATION COMPLETE message is not successfully received by 5GS 302 (step 321). As a result, if the network does not receive the REGISTRATION COMPLETE message, then the network does not know the low layer failure occurred in step 312 or occurred in step 313, and the network does not know whether UE 301 will continue to use the existing 5G-GUTI and the existing paging subgroup ID or will use the new 5G-GUTI and the new paging subgroup ID. Accordingly, in step 322, the AMF/RAN of 5GS 302 needs to consider both possible values of the paging subgroup ID as valid when transmitting or broadcasting PEI to UE 301 (i.e., page the UE), until the AMF of 5GS 302 knows one of the paging subgroup IDs can be considered as invalid.

In the embodiment of FIG. 3, in step 331, the AMF pages the UE 301 through NG-RAN node(s), using the previous paging subgroup ID (e.g., before the registration procedure) for deriving the paging subgroup of UE 301. In step 332, the AMF pages the UE 301 through NG-RAN node(s) by using the updated paging subgroup ID (e.g., assuming successful registration procedure) for deriving the paging subgroup of UE 301. The order of step 331 and step 332 is interchangeable. UE 301 monitors PEI/paging using one of the paging subgroup IDs, depending on the different cases. In step 341, UE 301 either responds to paging or sends a subsequent message to the network due to e.g., the UE triggers UE-initiated service procedure or UE-initiated (de-)registration procedure. Because the network uses two paging subgroup IDs to determine the paging subgroup for UE 301, UE 301 is able to receive the PEI and paging no matter which paging subgroup ID the UE uses to monitor the PEI. In step 351, the network can consider the old paging subgroup IDs as invalid, if the UE uses the new 5G-GUTI in step 341, or if the UE responds to paging in step 341 when the new paging subgroup ID is used. Similarly, the network can consider the new paging subgroup IDs as invalid, if the UE uses the old 5G-GUTI in step 341, or if the UE responds to paging in step 341 when the old paging subgroup ID is used.

Figure 4:
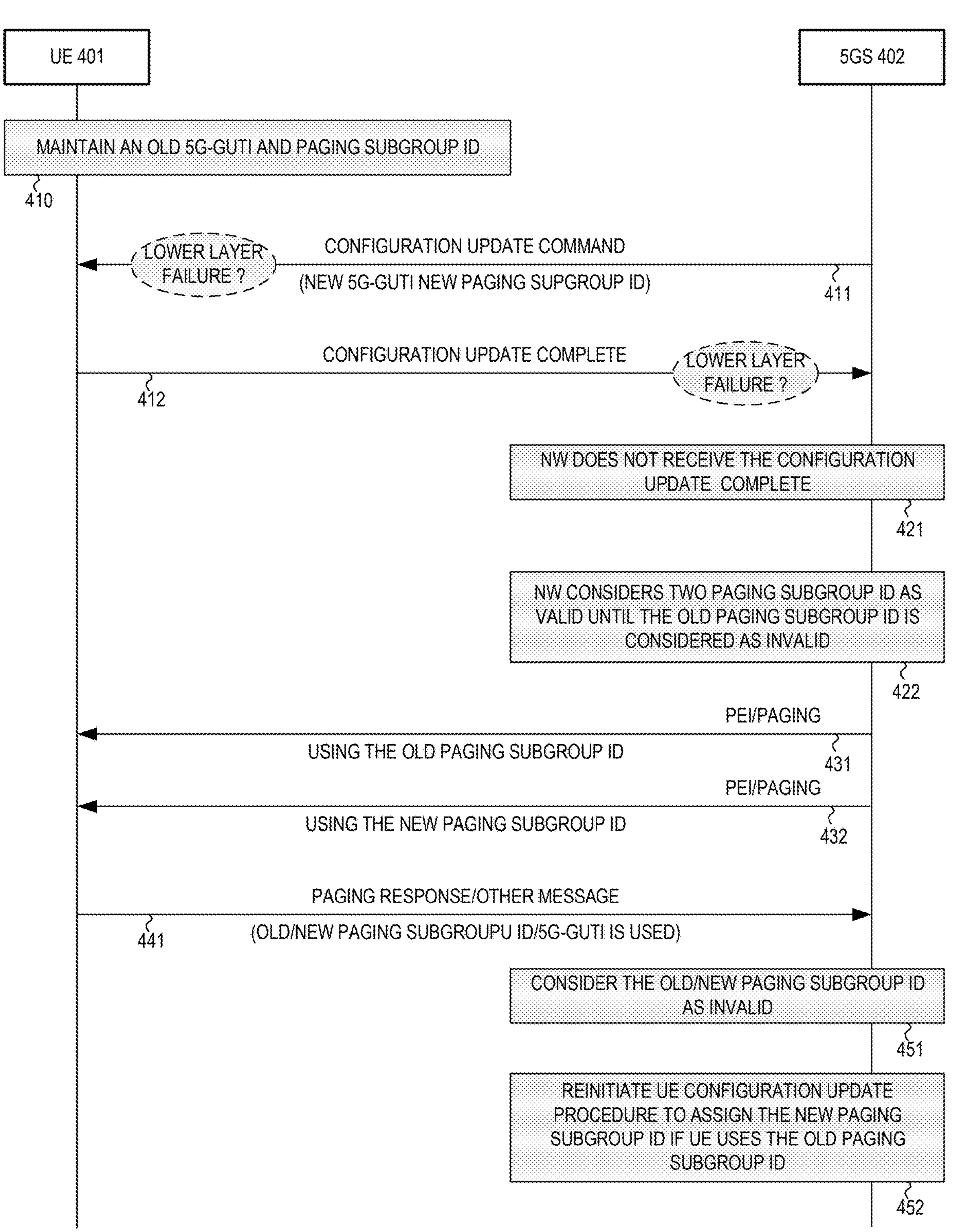
FIG. 4 illustrates another embodiment of handling lower layer failure when assigning a Paging Early Indication with Paging Subgrouping (PEIPS) subgroup ID during a configuration update procedure in accordance with one novel aspect.

FIG. 4 illustrates another embodiment of handling lower layer failure when assigning a Paging Early Indication with Paging Subgrouping (PEIPS) subgroup ID during a configuration update procedure in accordance with one novel aspect. The precondition (step 410) is that the network supports and accepts the use of PEIPS assistance information for the UE, and the UE indicates its capability to support NR paging subgrouping during a registration procedure.

Further, UE 401 was previously assigned an old 5G-GUTI and an old paging subgroup ID.

In step 411, 5GS 402 sends a CONFIGURATION UPDATE COMMAND message to UE 401. The CONFIGURATION UPDATE COMMAND message includes (negotiated) PEIPS assistance information containing a new paging subgroup ID and a new 5G-GUTI. However, due to low layer failure, the CONFIGURATION UPDATE COMMAND message may not be received by UE 401. If that is the case, then UE 401 continue to use the previous 5G-GUTI and the previous paging subgroup ID, without applying the new 5G-GUTI and the new paging subgroup ID. UE 401 will not (or is not able to, due to e.g., lower layer failure) send a CONFIGURATION UPDATE COMPLETE message to the network.

On the other hand, if UE 401 successfully receives the CONFIGURATION UPDATE COMMAND message, then UE 401 will apply the negotiated new paging subgroup ID in deriving the paging subgroup for monitoring PEI from the network. In addition, in step 412, UE 401 sends a CONFIGURATION UPDATE COMPLETE message to 5GS 402 to complete the update procedure. However, due to low layer failure, the CONFIGURATION UPDATE COMPLETE message is not successfully received by 5GS 402 (step 421). As a result, if the network does not receive the CONFIGURATION UPDATE COMPLETE message, then the network does not know the low layer failure occurred in step 411 or occurred in step 412, and the network does not know whether UE 401 will continue to use the existing 5G-GUTI and the existing paging subgroup ID or will use the new 5G-GUTI and the new paging subgroup ID. Accordingly, in step 422, the AMF of 5GS 402 needs to consider both possible values of the paging subgroup ID as valid when page the UE 401, until the AMF of 5GS 402 knows one of the paging subgroup IDs can be considered as invalid.

In the embodiment of FIG. 4, in step 431, the AMF pages the UE 401, using the previous paging subgroup ID (e.g., the paging subgroup ID used by UE before the update procedure) for deriving the paging subgroup of UE 401. In step 432, the AMF pages the UE using the updated paging subgroup ID (e.g., assuming successful update procedure) for deriving the paging subgroup of UE 401. The order of step 431 and step 432 is interchangeable. UE 401 monitors PEI/paging using one of the paging subgroup IDs, depending on the different cases. In step 441, UE 401 either responds to paging or sends a subsequent message to the network. Because the network uses two paging subgroup IDs to determine the paging subgroup for UE 401, UE 401 is able to receive the PEI and paging no matter which paging subgroup ID the UE uses to monitor the PEI and paging occasion. In step 451, the network can consider the old paging subgroup IDs as invalid, if the UE uses the new 5G-GUTI in step 441, or if the UE responds to paging in step 441 when the new paging subgroup ID is used. Similarly, the network can consider the new paging subgroup IDs as invalid, if the UE uses the old 5G-GUTI in step 441, or if the UE responds to paging in step 441 when the old paging subgroup ID is used. If the new paging subgroup ID is considered as invalid, then in step 452, the network 402 reinitiates a UE configuration update procedure to assign a second new paging subgroup ID to UE 401. The second new paging subgroup ID can be the same as the new paging subgroup ID, or the second new paging subgroup ID can be different from the new paging subgroup ID.

Figure 5:
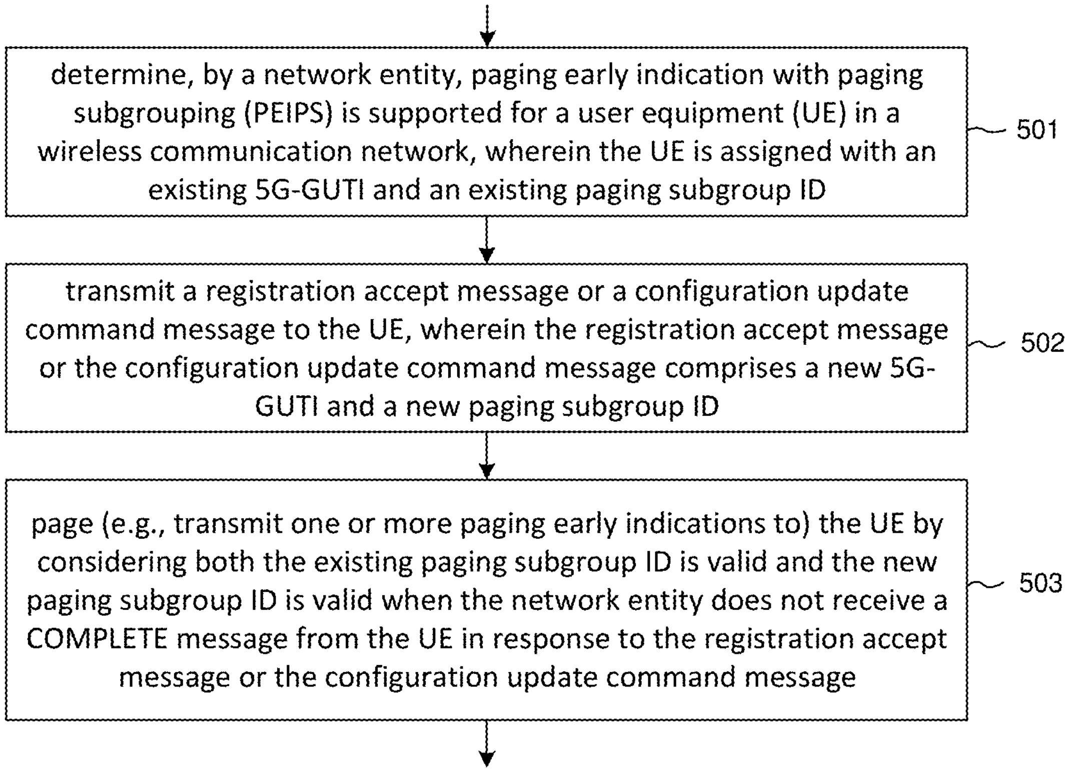
FIG. 5 is a flow chart of a method of handling of handling lower layer failure when assigning a Paging Early Indication with Paging Subgrouping (PEIPS) subgroup ID in accordance with one novel aspect.

FIG. 5 is a flow chart of a method of handling of handling lower layer failure when assigning a Paging Early Indication with Paging Subgrouping (PEIPS) subgroup ID in accordance with one novel aspect. In step 501, a network entity determines paging early indication with paging subgrouping (PEIPS) is supported for a user equipment (UE) in a wireless communication network, wherein the UE is assigned with an existing 5G-GUTI and an existing paging subgroup ID. In step 502, the network entity transmits a registration accept message or a configuration update command message to the UE, wherein the registration accept message or the configuration update command message comprises a new 5G-GUTI and a new paging subgroup ID. In step 503, the network entity pages the UE by considering the existing paging subgroup ID as valid and the new paging subgroup ID as valid when the network entity does not receive a COMPLETE message from the UE in response to the registration accept message or the configuration update command message.

Although the present invention is described above in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:

determining, by a network entity, paging early indication with paging subgrouping (PEIPS) is supported for a user equipment (UE) in a wireless communication network, wherein the UE is assigned with an existing 5G-GUTI and an existing paging subgroup ID;

transmitting a registration accept message or a configuration update command message to the UE, wherein the registration accept message or the configuration update command message comprises a new 5G-GUTI and a new paging subgroup ID; and paging the UE by considering the existing paging subgroup ID as valid and the new paging subgroup ID as valid when the network entity does not receive a COMPLETE message from the UE in response to the registration accept message or the configuration update command message.

2. The method of claim 1, wherein the network entity uses the existing paging subgroup ID followed by the new paging subgroup ID for paging the UE.

3. The method of claim 1, wherein the network entity considers the new paging subgroup ID as valid and the existing paging subgroup ID as invalid when the new 5G-GUTI is used by the UE in a subsequent message.

4. The method of claim 1, wherein the network entity considers the existing paging subgroup ID as valid when the existing 5G-GUTI is used by the UE in a subsequent message, and wherein the network entity assigns the UE a second new paging subgroup ID using a configuration update procedure.

5. The method of claim 1, wherein the network entity considers the new paging subgroup ID as valid and the existing paging subgroup ID as invalid when the UE responses to a paging that is based on the new paging subgroup ID.

6. The method of claim 1, wherein the network entity considers the existing paging subgroup ID as valid when the UE responses to a paging that is based on the existing paging subgroup ID, and wherein the network entity assigns the UE a second new paging subgroup ID using a configuration update procedure.

7. The method of claim 1, wherein the network entity does not receive the COMPLETE message due to a lower layer failure occurred before receiving the COMPLETE message.

8. The method of claim 7, wherein the network entity does not receive a REGISTRATION COMPLETE message in response to the REGISTRATION ACCEPT message.

9. The method of claim 7, wherein the network entity does not receive a CONFIGURATION UPDATE COMPLETE message in response to the CONFIGURATION UPDATE COMMAND message.

10. The method of claim 1, wherein the network entity receives an indication that the UE support PEIPS during a registration procedure.

11. A network entity, comprising:

a control circuit that determines paging early indication with paging subgrouping (PEIPS) is supported for a user equipment (UE) in a wireless communication network, wherein the UE is assigned with an existing 5G-GUTI and an existing paging subgroup ID;

a transmitter that transmits a registration accept message or a configuration update command message to the UE, wherein the registration accept message or the configuration update command message comprises a new 5G-GUTI and a new paging subgroup ID; and a paging handling circuit that pages the UE by considering the existing paging subgroup ID as valid and the new paging subgroup ID as valid when the network entity does not receive a COMPLETE message from the UE in response to the registration accept message or the configuration update command message.

12. The network entity of claim 11, wherein the network entity pages the UE using the existing paging subgroup ID followed by using the new paging subgroup ID.

13. The network entity of claim 11, wherein the network entity considers the new paging subgroup ID as valid and the existing paging subgroup ID as invalid when the new 5G-GUTI is used by the UE in a subsequent message.

14. The network entity of claim 11, wherein the network entity considers the existing paging subgroup ID as valid when the existing 5G-GUTI is used by the UE in a subsequent message, and wherein the network entity assigns the UE a second new paging subgroup ID using a configuration update procedure.

15. The network entity of claim 11, wherein the network entity considers the new paging subgroup ID as valid and the existing paging subgroup ID as invalid when the UE responses to a paging that is based on the new paging subgroup ID.

16. The network entity of claim 11, wherein the network entity considers the existing paging subgroup ID as valid when the UE responses to a paging that is based on the existing paging subgroup ID, and wherein the network entity assigns the UE a second new paging subgroup ID using a configuration update procedure.

17. The network entity of claim 11, wherein the network entity does not receive the COMPLETE message due to a lower layer failure occurred before receiving the COMPLETE message.

18. The network entity of claim 17, wherein the network entity does not receive a REGISTRATION COMPLETE message in response to the REGISTRATION ACCEPT message.

19. The network entity of claim 17, wherein the network entity does not receive a CONFIGURATION UPDATE COMPLETE message in response to the CONFIGURATION UPDATE COMMAND message.

20. The network entity of claim 11, wherein the network entity receives an indication that the UE support PEIPS during a registration procedure.

* * * * *